United States Patent
Kim et al.

(10) Patent No.: US 9,338,808 B2
(45) Date of Patent: May 10, 2016

(54) METHOD OF DIRECT COMMUNICATION BY TERMINAL

(71) Applicant: Electronics and Telecommunications Research Institute, Daejeon (KR)

(72) Inventors: Eunkyung Kim, Daejeon (KR); Anseok Lee, Daejeon (KR); Wooram Shin, Daejeon (KR); Jae Sun Cha, Daejeon (KR); Kwang Jae Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 219 days.

(21) Appl. No.: 14/073,180

(22) Filed: Nov. 6, 2013

(65) Prior Publication Data

US 2014/0140286 A1 May 22, 2014

(30) Foreign Application Priority Data

| Nov. 9, 2012 | (KR) | 10-2012-0126568 |
| Nov. 12, 2012 | (KR) | 10-2012-0127113 |
| Nov. 15, 2012 | (KR) | 10-2012-0129215 |
| Aug. 9, 2013 | (KR) | 10-2013-0094981 |
| Nov. 4, 2013 | (KR) | 10-2013-0133147 |

(51) Int. Cl.
*H04W 76/02* (2009.01)
*H04W 8/00* (2009.01)

(52) U.S. Cl.
CPC ............ *H04W 76/023* (2013.01); *H04W 8/005* (2013.01)

(58) Field of Classification Search
None
See application file for complete search history.

(56) References Cited

U.S. PATENT DOCUMENTS

| 2003/0179750 | A1* | 9/2003 | Hasty et al. ................ 370/390 |
| 2007/0265009 | A1* | 11/2007 | Hamaguchi ................ 455/436 |
| 2009/0010179 | A1* | 1/2009 | Laroia et al. ................ 370/254 |
| 2010/0136997 | A1* | 6/2010 | Palanki et al. ............. 455/452.1 |
| 2011/0223953 | A1 | 9/2011 | Lee et al. |
| 2012/0269072 | A1* | 10/2012 | Wu et al. ................... 370/242 |
| 2013/0016646 | A1 | 1/2013 | Chang et al. |
| 2014/0003293 | A1* | 1/2014 | Borges et al. ............... 370/255 |

FOREIGN PATENT DOCUMENTS

KR    10-2012-0065918 A    6/2012

* cited by examiner

*Primary Examiner* — Donald Mills
(74) *Attorney, Agent, or Firm* — Rabin & Berdo, P.C.

(57) ABSTRACT

A method for a first terminal communicating with a base station to perform direct communication with a second terminal is provided. The first terminal determines first timing for transmitting or receiving a first signal to or from the base station. Next, the first terminal determines second timing for transmitting a second signal for terminal discovery to the second terminal. When the first timing and the second timing overlap, the first terminal then changes either the first timing or the second timing.

18 Claims, 6 Drawing Sheets

METHOD OF DIRECT COMMUNICATION BY TERMINAL

CROSS-REFERENCE TO RELATED APPLICATION

This application claims priority to and the benefit of Korean Patent Application Nos. 10-2012-0126568, 10-2012-0127113, 10-2012-0129215, 10-2013-0094981, and 10-2013-0133147 respectively filed in the Korean Intellectual Property Office on Nov. 9, 2012, Nov. 12, 2012, Nov. 15, 2012, Aug. 9, 2013, and Nov. 4, 2013, the entire contents of which are incorporated herein by reference.

BACKGROUND OF THE INVENTION (a) Field of the Invention

The present invention relates to a method of direct communication between terminals (or devices or equipment). More particularly, the present invention relates to a method of providing communication service between terminals in a wireless communication system.

(b) Description of the Related Art

A method of establishing a direct link between terminals to provide a proximity-based service in a wireless communication system is currently being discussed in IEEE 802.11(Pre-association discovery; PAD), 802.15 (TG8, Peer Aware Communication; PAC), 802.16 (GRIDMAN TG), and 3GPP (Proximity-based Service; ProSe).

Services through a direct link between terminals now under discussion can be used for public safety, disaster relief, proximity-based services (LTE Device to Device Proximity Discovery), etc. To establish a direct link, the possibility of establishing a direct link is assessed by discovering for neighboring terminals.

However, the prior art only describes methods for performing device discovery operations (e.g., transmitting a reference signal, reporting after signal strength measurement, and so on) upon a request from a base station. According to the prior art, a neighboring device discovery will affect existing services between a base station and a terminal. Particularly, if resources to be provided to lower-level terminals of a base station (e.g., terminals registered with a base station) are used as resources for device discovery (for establishing a direct link), the prior art can bring about many problems.

SUMMARY OF THE INVENTION

The present invention has been made in an effort to provide an efficient device discovery method for establishing a direct link between terminals, and a method of discovering terminals and establishing a direct link while continuously providing communication service between a base station and terminals.

An exemplary embodiment of the present invention provides a method for a first terminal communicating with a base station to perform direct communication with a second terminal. The method of direct communication includes: determining first timing for transmitting or receiving a first signal to or from the base station; determining second timing for transmitting a second signal for terminal discovery to the second terminal; and when the first timing and the second timing overlap, changing either the first timing or the second timing.

The first signal may be either a feedback signal transmitted to the base station or a data signal transmitted to the base station in every first period.

The changing may include: receiving first timing change information from the base station; and changing the first timing based on the first timing change information.

The changing may include changing the first timing to preset timing.

The preset timing may be K-th (where K is a natural number) uplink timing after the second timing or K-th uplink timing before the second timing.

The method of direct communication may further include transmitting the first signal to the base station in every the first period after transmitting the first signal at the preset timing.

The first signal may be a signal associated with an operation based on a time synchronization of HARQ (hybrid automatic repeat request) operations.

The first signal may be a signal associated with a persistent resource allocation operation.

The first signal may be a signal associated with a group resource allocation operation.

The method of direct communication may further include receiving, from the base station, first information indicating whether direct communication is possible, which is determined based on the received signal strength of the second signal that the second terminal received.

The method of direct communication may further include, when the first information indicates that direct communication with the second terminal is possible, establishing a first link for direct communication with the second terminal.

The establishing may include, when in communication with the second terminal via the base station, transmitting, to the base station, a request message for changing a second link corresponding to the first communication to the first link.

The request message may include a service connection identifier identifying the second link.

The establishing may include, when a second link corresponding to a first communication with the second terminal via the base station is not established, transmitting a request message for establishing the first link to the base station.

Another embodiment of the present invention provides a method for a first terminal communicating with a base station to perform direct communication with a second terminal. The method of direct communication may include: determining first timing for transmitting or receiving a first signal to or from the base station; determining second timing for receiving a second signal for terminal discovery from the second terminal; when the first timing and the second timing overlap, changing either the first timing or the second timing; and reporting the received signal strength of the second signal to the base station.

In the reporting, one of the following methods may be used: a first reporting method of reporting the received signal strength of the second signal each time the second signal is received; a second reporting method of reporting the received signal strength of the second signal when the received signal strength of the second signal is greater than a threshold; and a third reporting method of reporting average received signal strength of second signals received during a first time.

Yet another embodiment of the present invention provides a terminal. The terminal includes: a radio frequency converter; and a processor connected to the radio frequency converter and controlling direct communication with a first terminal and communication with a base station. The processor determines first timing for transmitting or receiving a first signal for communication with the base station to or from the base station, determines second timing for transmitting a second signal for discovering the first terminal to the first terminal, and when the first timing and the second timing overlap, changes either the first timing or the second timing.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, a mobile station (MS) may designate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), equipment, a device, etc., and may include all or some functions of the MT, MS, AMS, HR-MS, SS, PSS, AT, UE, equipment, device, etc.

A base station (BS) may designate an advanced base station (ABS), a high reliability base station (HR-BS), a node B, an evolved node B (eNodeB), an access point (AP), a radio access station (RAS), a base transceiver station (BTS), a mobile multi hop relay (MMR)-BS, a relay station (RS) serving as a base station, a high reliability relay station (HR-RS) serving as a base station, a home node B (HNB), a home eNodeB (HeNB), a small BS, etc., and may include all or some functions of the ABS, nodeB, eNodeB, AP, RAS, BTS, MMR-BS, RS, HR-RS, HNB, HeNB, small BS, etc.

Figure 1:
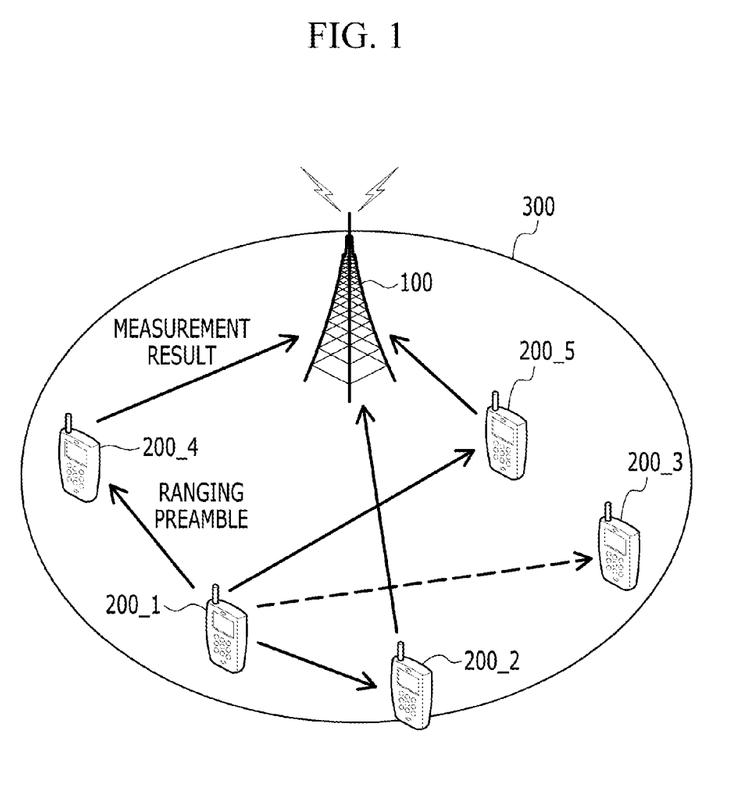
FIG. 1 is a view showing a device discovery process for establishing a direct link between terminals according to an exemplary embodiment of the present invention.

FIG. 1 is a view showing a device discovery (or terminal discovery) process for establishing a direct link between terminals according to an exemplary embodiment of the present invention.

FIG. 1 illustrates a base station 100 and terminals 200_1 to 200_5 which exchange data through wireless communication. The terminals 200_1 to 200_5 have a function of establishing a direct link with neighboring terminals 200_1 to 200_5 and exchanging data with each other (themselves) via the direct link, as well as a function of exchanging data with the base station 100.

The terminal 200_1 transmits a reference signal (or ranging preamble signal) for device discovery to the neighboring terminals 200_2 to 200_5. The neighboring terminals 200_2 to 200_5 receive the reference signal, and measure the received signal strength of the reference signal and report the measurement results to the base station 100.

The device discovery for establishing a direct link between terminals may include a discovery initiating by the base station, a discovery initiating by a terminal, and an autonomous discovery by a terminal. The device discovery process will be described in more detail with reference to FIG. 2A.

Figure 2A:
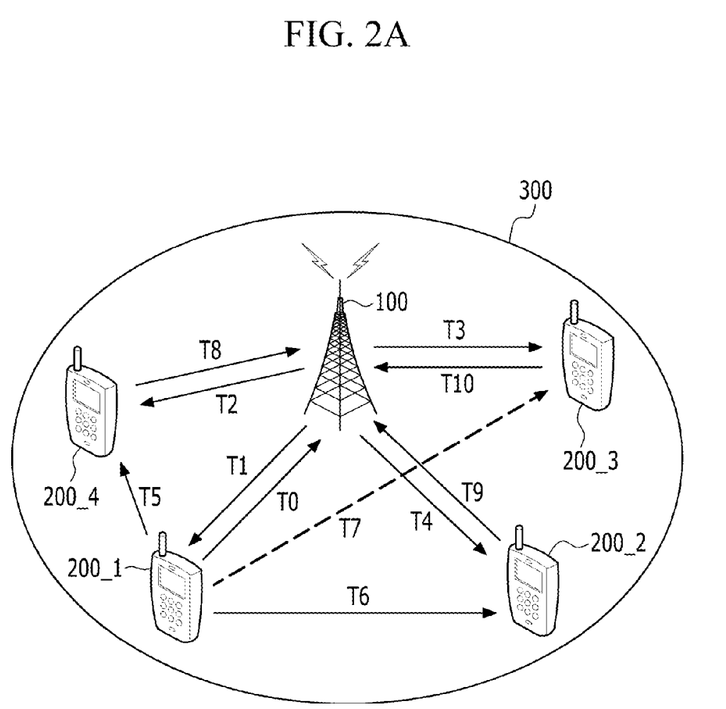
FIG. 2A is a view showing one example of the device discovery process of FIG. 1.

FIG. 2A is a view showing the device discovery process of FIG. 1 in detail. Specifically, FIG. 2A shows a procedure of discovery on requests from the base station 100 and the terminals 200_1 to 200_4 (i.e., a device discovery on a request from the base station 100 and a device discovery on a request from a terminal (e.g., 200_1).

1. Discovery on Request from Base Station 100

If a data exchange between a terminal (e.g., 200_1) and terminals (e.g., 200_2 to 200_4) occurs in a service area 300 of the base station 100 via the base station 100 (through relaying of the base station 100), the base station 100 requests (T1) the terminal 200_1 to transmit (T5, T6, and T7) a reference signal to the terminals 200_2 to 200_4 to establish a direct link, and requests (T2, T3, and T4) the terminals 200_2 to 200_4 to receive the reference signal from the terminal 200_1, measure the received signal strength of the signal, and report (T8, T9, and T10) the measurement results to the base station 100. Specifically, upon a device discovery request, the base station 100 may transmit a request message containing information about whether the received signal strength of the reference signal will be reported to the base station 100 or to a reference signal transmitting terminal (e.g., 200_1) to a reference signal receiving terminal (e.g., 200_2). The base station 100 assesses the possibility of establishing a direct link between the terminal 200_1 and the terminals 200_2 to 200_4 based on the measurement results reported from the terminals 200_2 to 200_4.

Upon receiving a request from the base station 100, the terminals 200_1 to 200_4 may start, reject, or delay their device discovery by sending responses such as acceptance, rejection, or delay, to this request. If the terminals 200_1 to 200_4 reject this request, a response message for this request may contain the reason for rejection (e.g., low battery).

Figure 2B:
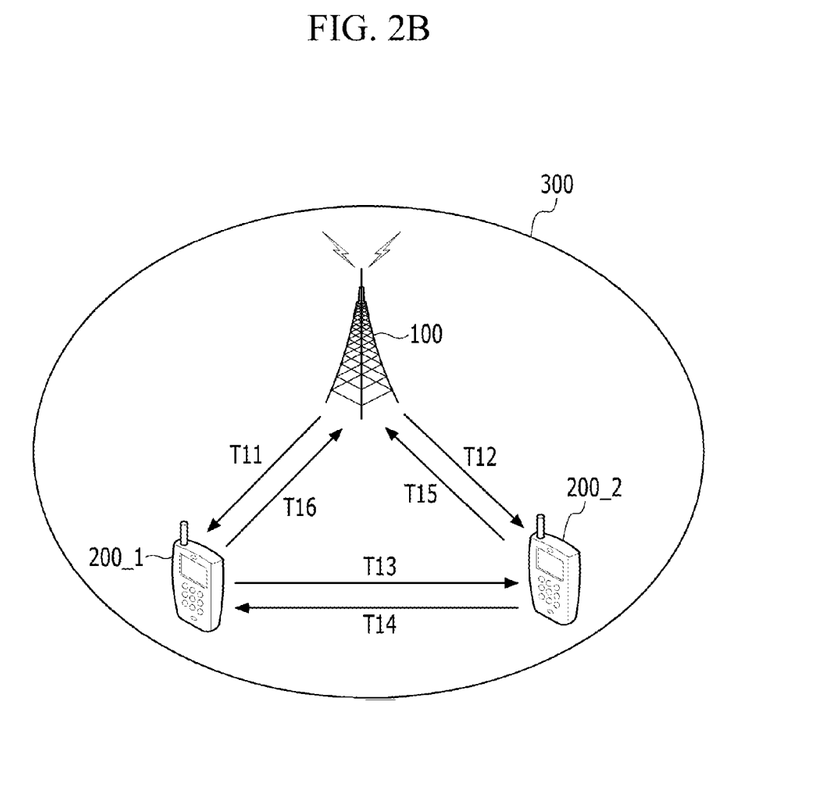
FIG. 2B is a view showing another example of the device discovery process of FIG. 1.

As shown in FIG. 2B, in order to measure the signal strength for terminals, the base station 100 may request (T11) the terminal 200_1 to receive a reference signal transmitted (T14) from the terminal 200_2 and report (T16) the measured received signal strength to the base station 100, and request (T12) the terminal 200_2 to receive a reference signal transmitted from the terminal 200_1, receive the reference signal, and report (T15) the measured received signal strength to the base station 100. If the received signal strength of a reference signal needs to be reported to a terminal, a terminal (e.g., 200_2) that has received the reference signal may report (e.g., feedback) the measured received signal strength of the reference signal to a terminal (e.g., 200_1) that has transmitted the reference signal. Upon receiving the measured received signal strength of the reference signal from the terminal (e.g., 200_2), the terminal (e.g., 200_1) may report the transmitted received signal strength of the reference signal to the base station 100. To this end, the base station 100 may request the reference signal transmitting terminal (e.g., 200_1) to receive a report about the received signal strength of the reference signal from the reference signal receiving terminal (e.g., 200_2).

The base station 100 may inform a terminal (e.g., 200_2) of information (hereinafter, "resource information for reporting") about the resource (location) used to report the received signal strength of a reference signal. Specifically, upon a device discovery request, the base station 100 may allocate a resource for feedback (required to receive a report about the received signal strength of the reference signal) and inform a terminal (e.g., 200_2) about it, or notify the terminal (e.g., 200_2) to report the received signal strength of the reference signal by using a defined resource (a resource defined for feedback). Upon receiving the resource information for reporting from the base station 100, the terminal (e.g., 200_2) may report the received signal strength of the reference signal by using the resource corresponding to the resource information for reporting. The resource (i.e., resource corresponding to the resource information for reporting) used to report the received signal strength of the reference signal may be reported through a MAC message or MAC header transmitted to the base station 100 from the terminal (e.g., 200_2), in addition to through the defined resource and the allocation for feedback as described above. The terminal (e.g., 200_2) may inform the base station 100, in a MAC message or MAC header (or piggyback on a MAC header), that it has received the resource information for reporting. The base station 100 may request the terminal 200_1 to periodically transmit a reference signal (hereinafter, "periodic reference signal transmission") and request the terminals 200_2 to 200_4 to periodically report the measured received signal strength of the reference signal (hereinafter, "periodic received signal strength reporting"). When making a periodic reference signal transmission request, the base station 100 may transmit a periodic reference signal transmission request message containing periodic information, termination timing information, or number of discoveries to the terminal 200_1. Likewise, when making a periodic received signal strength report request, the base station 100 may transmit a periodic received signal strength report request message containing periodic information, termination timing information, or number of discoveries to the terminals 200_2 to 200_4. The terminals 200_1 to 200_4 may accept the request of the base station 100 after changing the information (e.g., periodic information, termination timing information, or number of discoveries, or received signal strength reporting timing information) contained in the request message received from the base station 100. Also, the terminals 200_1 to 200_4 may accept the request of the base station 100 based on the information contained in the request message received from the base station 100. For example, if the request message received from the base station 100 contains termination timing information, the terminals 200_1 to 200_4 perform a device discovery based on the termination timing information, if the request message received from the base station 100 contains periodic information, the terminals 200_1 to 200_4 persistently perform a device discovery based on the periodic information, and if the request message received from the base station 100 contains the number of discoveries, the terminals 200_1 to 200_4 perform a device discovery based on the number of discoveries. If the request message received from the base station 100 does not contain periodic information, termination timing information, or number of discoveries, or if the number of discoveries is 1, the terminals 200_1 to 200_4 perform the device discovery only once.

If the base station 100 or the terminals 200_1 to 200_4 need to finish their periodic device discovery, a device discovery termination process may be performed through a terminal request. When making a termination request, the terminals 200_1 to 200_4 may request the termination of a device discovery by using a termination request message containing the reason for termination (e.g., low battery, quality deterioration of direct link signals, or disconnection of a direct link).

If the base station 100 or the terminals 200_1 to 200_4 need to change the period of a periodic device discovery, a discovery period changing process may be performed through a period change request.

Given the mobility of the terminals 200_1 to 200_4, when the communication between the base station 100 and a terminal (e.g., 200_1) is cut off, the base station 100 may induce the establishment of a direct link by requesting a terminal (e.g., 200_4) capable of communicating with the base station 100 to transmit a reference signal.

If a terminal (e.g., 200_2) receives a report request from the base station 100, it may report the measured received signal strength of the reference signal to the base station 100.

If the received signal strength of a reference signal needs to be reported to a terminal, a terminal (e.g., 200_2) that has received the reference signal may report (e.g., feedback) the measured received signal strength of the reference signal to a terminal (e.g., 200_1) that has transmitted the reference signal. Upon receiving the measured received signal strength of the reference signal, the terminal (e.g., 200_1) may report the transmitted received signal strength of the reference signal to the base station 100. To this end, the base station 100 may request the reference signal transmitting terminal (e.g., 200_1) to receive a report about the received signal strength of the reference signal from the reference signal receiving terminal (e.g., 200_2), or allocate some of the resources for reference signal transmission as a resource for feedback (required to receive a report about the received signal strength of the reference signal). Likewise, upon a device discovery request, the base station 100 may transmit a request message containing information about whether the received signal strength of the reference signal will be reported to the base station 100 or to a reference signal transmitting terminal (e.g., 200_1) to a reference signal receiving terminal (e.g., 200_2).

2. Discovery on Request from Terminal (e.g., 200_1)

A terminal (e.g., 200_1) requests a device discovery when establishing a direct link or managing an existing direct link (discovering again due to a disconnection or the like).

Firstly, to establish a direct link, a device discovery can be performed by a terminal (e.g., 200_1) requesting (T0) the base station 100 to allocate data for reference signal transmission. The process following the terminal (e.g., 200_1) discovery request (T0) is similar to the above-described discovery process performed on the request of the base station 100.

Further, if the signal strength is attenuated while a terminal (e.g., 200_1) is exchanging data with another terminal (e.g., 200_2) via a direct link, thus making it difficult maintain the direct link or requiring the terminal (e.g., 200_1) to re-establish a direct link with a new terminal (e.g., 200_4), a device discovery may be performed by the terminal (e.g., 200_1) requesting (T0) the base station 100 to perform a discovery. The device discovery in this case may also be performed, changed, or terminated through all or some of the above-described discovery process steps performed on the request of the base station 100.

On the other hand, the base station 100 may request a terminal (e.g., 200_2) other than the terminal (e.g., 200_1) that has requested (T0) the device discovery to transmit a reference signal, and request the terminal (e.g., 200_1) that has requested (T0) the device discovery to receive the reference signal.

A discovery (not shown) on a terminal's own is performed as follows.

3. Autonomous Discovery on Terminal's (e.g., 200_1) Own Will

If the base station 100 does not exist or the base station 100 is not involved (e.g., if a direct link between terminals needs to be maintained or managed without the involvement of the base station 100), the terminal (e.g., 200_1) may voluntarily perform a device discovery. In this case, the terminal (e.g., 200_1) voluntarily transmits a reference signal, and the terminal (e.g., 200_2) receives the reference signal and establishes a direct link with the terminal (e.g., 200_1) that has transmitted the reference signal, whereby direct communication can be established. The terminal (e.g., 200_2) that has received the reference signal may measure the strength of the reference signal, and report the measured received signal strength of the reference signal to the terminal (e.g., 200_1) that has transmitted the reference signal. In this case, a device discovery operation (e.g., transmission/reception of a reference signal) may be performed via an existing direct link established between the two terminals (e.g., 200_1 and 200_2) or through allocated resources (e.g., existing resources allocated by the base station 100 or existing resources allocated for device discovery). The terminal (e.g., 200_1) may indicate the resource (location) the terminal (e.g., 200_2) uses to report the measured received signal strength of the reference signal, and the terminal (e.g., 200_2) may report the received signal strength of the reference signal to the terminal (e.g., 200_1) by using the indicated location. Also, when reporting the received signal strength of a reference signal by using a defined resource, the terminal (e.g., 200_1) may indicate only the fact (that it reports the received signal strength of a reference signal by using a defined resource), and report the received signal strength of the reference signal by using this resource. A discovery on a terminal's own will may also be performed, changed, or terminated through all or some of the above-described discovery process steps performed on the base station 100's request.

Next, a process in which a terminal (e.g., 200_2) receives a reference signal, measures the received signal strength of the reference signal, and reports the measurement result will be described.

Methods of measuring and reporting the received signal strength of a reference signal include a method of measuring and reporting the received signal strength each time a reference signal is received, a method of reporting the measured received signal strength of a reference signal which exceeds a threshold, and a method of reporting the average received signal strength of reference signals received for a given period of time. Periodic transmission of reference signals, periodic reception of reference signals, and periodic reporting of the measured received signal strength of reference signals can enhance the reliability and accuracy of device discovery.

Next, a method of performing a device discovery to establish a direct link while data is being exchanged between the base station 100 and terminals (e.g., 200_1 and 200_2) will be described. The device discovery should have as little effect as possible on the data exchange between the base station 100 and the terminals (e.g., 200_1 and 200_2). For example, when a terminal (e.g., 200_1) transmits a reference signal using a downlink resource of the base station 100, the base station 100 allocates a data area for reference signal transmission so that the base station 100 interferes with the downlink as little as possible, or may not use this downlink resource. When the terminal (e.g., 200_1) transmits a reference signal using an uplink resource of the base station 100, the base station 100 does not allocate this uplink resource to other terminals (e.g., 200_2 to 200_4), but instead allows the terminal (e.g., 200_2) to receive the reference signal, rather than to transmit uplink data to the base station 100, at the timing for the uplink resource.

Accordingly, if an operation based on time synchronization between the base station 100 and terminals (e.g., 200_1 and 200_2) is required (e.g., periodic or timing-based data transmission/reception), the base station 100 does not allow the reference signal transmitting terminal (e.g., 200_1) to receive data from the base station 100 at a reference signal transmission timing and does not allow the reference signal receiving terminal (e.g., 200_2) to transmit data to the base station 100 at a reference signal reception timing. Specifically, when the terminal 200_1 transmits a reference signal using an uplink resource of the base station 100, it may not transmit data to the base station 100, and when the terminal 200_1 transmits a reference signal using a downlink resource, it may not receive data from the base station 100. When the terminal 200_2 receives a reference signal using an uplink resource of the base station 100, it may not transmit data to the base station 100, and when the terminal 200_2 receives a reference signal using a downlink resource, it may receive data from the base station 100. However, if the data reception from the base station 100 and the reference signal reception from the terminal 200_1 occur in the same data area, this might make the data reception difficult.

Typical examples of operations based on time synchronization between the base station 100 and terminals (e.g., 200_1 and 200_2) include periodic or timing-based uplink feedback (hybrid automatic repeat request (HARQ) ACK/NACK feedback, feedback for channel status reporting (channel status reporting for data allocation), feedback for MIMO, feedback for power control, feedback for interference control, etc.), re-transmission as a part of HARQ operation or the like, group resource allocation, and persistent resource allocation. Hereinafter, a method of ensuring continuity of service between the base station 100 and the terminals (e.g., 200_1 and 200_2) and efficiently performing a device discovery to establish a direct link, which is to be applied to each operation based on time synchronization, will be described in detail.

1. Periodic or Timing-Based Feedback

Periodic or timing-based feedback includes HARQ ACK/NACK feedback, feedback for channel status reporting, feedback for MIMO, feedback for power control, feedback for interference control, and uplink data transmission operations based on time synchronization such as periodic ranging and periodic sounding.

The base station 100 allows terminals (e.g., 200_1 and 200_2) to perform a device discovery operation (e.g., reference signal transmission/reception) in a way to not affect the timing of feedback or the timing of uplink data transmission. Alternatively, if timing-based data transmission timing overlaps with discovery timing (e.g., reference signal transmission timing or reference signal reception timing), this data transmission timing may be explicitly changed and this change may be notified to the terminals (e.g., 200_1 and 2002), or the terminals (e.g., 200_1 and 200_2) may be allowed to transmit the data at implicitly preset timing. The preset timing may be defined as the K-th (where K is a natural number, e.g., 1) uplink timing after the reference signal transmission/reception timing or as the K-th uplink timing before the reference signal transmission/reception timing. On the other hand, if a periodic data exchange occurs between the base station 100 and terminals (e.g., 200_1 and 200_2), the base station 100 allows the terminals (e.g., 200_1 and 200_2) to maintain any periodic data transmission timing overlapping with device discovery timing (e.g., reference signal transmission timing or reference signal reception timing) and exchange (transmit/receive) data with the base station 100 at preset timing, instead of this data transmission timing, and then exchange (transmit/receive) data with the initial period at the next data exchange (transmit/receive) timing. The reference signal transmitting terminal (e.g., 200_1) cannot receive data from the base station 10 at reference signal transmission timing, but can transmit data to the base station 100 simultaneously with the reference signal transmission. Also, the reference signal receiving terminal (e.g., 200_2) can receive data from the base station 100 at reference signal reception timing, but is constrained from transmitting data to the base station 100 at the reference signal reception timing.

2. Timing (Synchronization)-Based HARQ Operation

The base station 100 is able to allow a timing (synchronization)-based HARQ operation to be performed similarly to the above-described periodic or timing-based feedback (e.g., HARQ ACK/NACK feedback). That is, the base station 100 may allow a re-transmission operation to be performed at the above-described preset timing, rather than at re-transmission timing overlapping with device discovery timing (e.g., reference signal transmission timing or reference signal reception timing). Alternatively, the base station 100 may explicitly change re-transmission timing overlapping with device discovery timing (e.g., reference signal transmission timing or reference signal reception timing) and notify the terminals (e.g., 200_1 and 200_2) of this change.

3. Group Resource Allocation

If one or more terminals (e.g., 200_1 and 200_2) of a group to be allocated resources perform a device discovery operation (reference signal transmission/reception), the base station 100 may exclude these terminals (e.g., 200_1 and 200_2) from those for which group resource allocation is to be performed. Alternatively, the base station 100 may allow the terminals (e.g., 200_1 and 200_2) to explicitly or implicitly change the resource allocation timing at the time of group resource allocation, as is the case with the above-described periodic or timing-based feedback (e.g., HARQ ACK/NACK feedback). If the terminals (e.g., 200_1 and 200_2) are excluded from those for which group resource allocation is to be performed, the base station 100 may schedule different resource allocation timing than the device discovery timing to allocate resources to the terminals (e.g., 200_1 and 200_2). The group resource allocation includes transmitting data to the terminals (e.g., 200_1 and 200_2) using downlink resources allocated by the base station 100 and transmitting data to the base station 100 using uplink resources allocated by the terminals (e.g., 200_1 and 200_2).

4. Persistent Resource Allocation

If one or more terminals (e.g., 200_1 and 200_2) to be persistently allocated resources perform a device discovery operation (reference signal transmission/reception), the base station 100 may allow the terminals (e.g., 200_1 and 200_2) to explicitly or implicitly change the persistent resource allocation timing, as is the case with the above-described periodic or timing-based feedback (e.g., HARQ ACK/NACK feedback). Also, the base station 100 may allow the persistent resource allocation to continue with the initial period after resource allocation timing overlaps with the device discovery timing. Alternatively, the base station 100 may allow the persistent resource allocation to be performed newly at timing not overlapping with the device discovery timing. The persistent resource allocation includes transmitting data to the terminals (e.g., 200_1 and 200_2) using downlink resources allocated by the base station 100 and transmitting data to the base station 100 using uplink resources allocated by the terminals (e.g., 200_1 and 200_2).

Next, a method of establishing a direct link after completion of a device discovery will be described in detail.

A terminal (e.g., 200_2) that has received a reference signal reports the measured received signal strength of the reference signal to the base station 100. The base station 100 determines whether direct communication is possible between two terminals (e.g., 200_1 and 200_2) based on the reported received signal strength of the reference signal. If it is determined that direct communication is possible between them, the base station 100 may request the terminals (e.g., 200_1 and 200_2) to establish a direct link. A method of establishing a direct link will be described in detail with reference to FIGS. 3A and 3B.

Figure 3A:
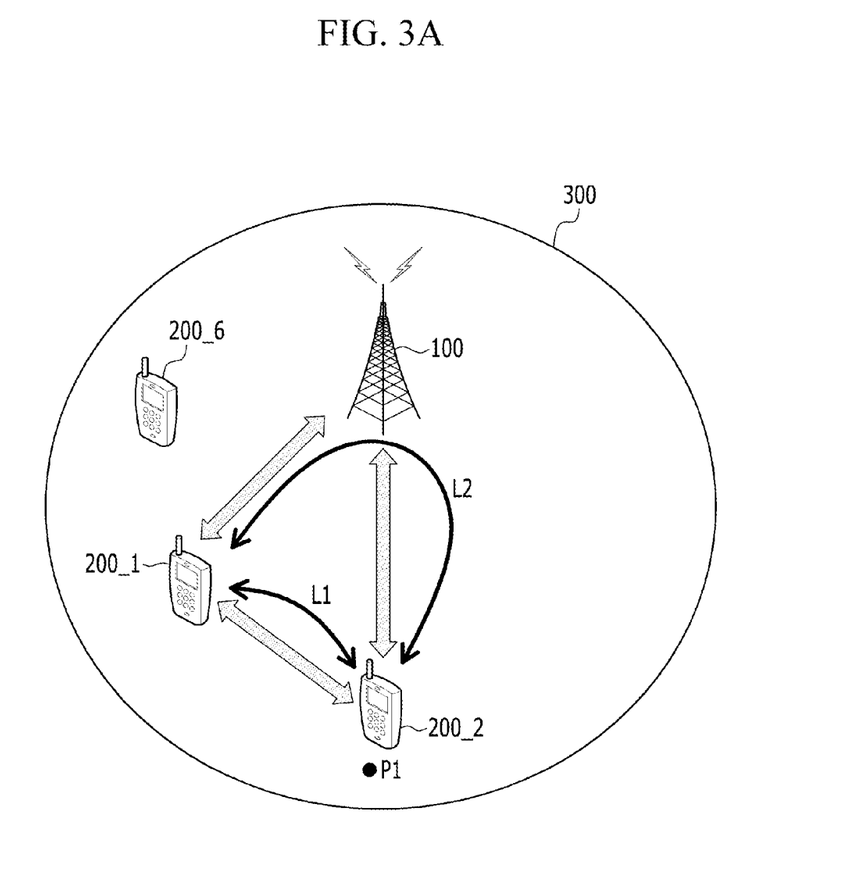
FIGS. 3A and 3B are views showing a service between terminals via a base station and a service between terminals communicating via direct communication link according to an exemplary embodiment of the present invention.
Figure 3B:
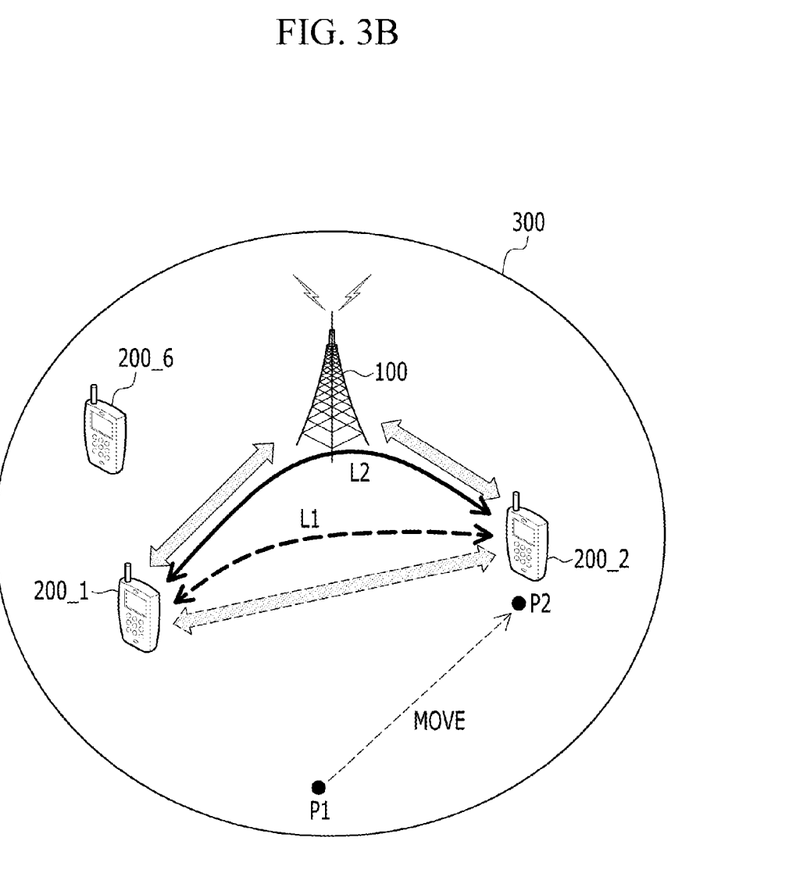

FIGS. 3A and 3B are views showing a service between terminals via the base station 100 (through the relaying of the base station 100) and a service between terminals via direct communication according to an exemplary embodiment of the present invention.

A method of establishing a direct link when there is a link L2 established between two terminals 200_1 and 200_2 and a method of establishing a direct link when there is no link established between two terminals (200_1 and 200_6) will be described.

1. When there is a Link L2 Between Two Terminals 200_1 and 200_2

A link L2 between two terminals 200_1 and 200_2 corresponds to a communication (or service) between the two terminals 200_1 and 200_2 that is performed via the base station 100 (or by routing). Before a direct communication link L1 is established, a service connection between the two terminals 200_1 and 200_2 is made through the base station 100 and an upper layer.

If it is determined based on the received signal strength of the reference signal that direct communication is possible between the two terminals 200_1 and 200_2, the base station 100 may notify the terminals 200_1 and 200_2 that direct communication is possible between the two terminals 200_1 and 200_2 to induce (or offer) the two terminals 200_1 and 200_2 to establish a direct link or request them to establish a direct link.

Upon being notified by the base station that a direct link can be established, the terminal 200_1 may continue the existing service by requesting the base station 100 to change the existing link L2 to the direct link L1. The change to the direct link L1 can be done while keeping the configuration parameters of the existing link L2 the same. Alternatively, the change to the direct link L1 can be done merely by adding/changing the parameters required for the direct link L1. Also, the terminal 200_1 may provide service by releasing the existing link L2 and then establishing the direct link L1.

The terminal 200_1 may inform the base station 100 of the service using the link which the terminal 200_1 tries to change to the direct link L1 by using a message containing a service connection identifier or a message specialized for direct link establishment.

Also, the base station 100 may request the terminal 200_1 to wait for a given period of time to establish a direct link with the other terminal 200_2, and may notify the terminal 200_1 of the result (success, failure, etc.) of the direct link establishment request to the terminal 200_2.

Upon a request from the terminal 200_1 to change to the direct link L1, the base station 100 requests a neighboring terminal 200_2 to change the existing link L2 to the direct link L1. Upon a request from the base station 100 to change to the direct link L1, the terminal 200_2 changes the existing link L2 to the direct link L1 in order to provide service via the direct link L1, instead of the existing link L2. When the direct link L1 is successfully established between the two terminals 200_1 and 200_2, the two terminals 200_1 and 200_2 may transmit/receive data via the direct link L1.

The base station 100 may request the terminals 200_1 and 200_2 to establish the direct link L1, either individually or simultaneously. In this case, the base station 100 may allow the existing link L2 to be changed to the direct link L1 or allow the direct link L1 to be established after the release of the existing link L2, as described above. Moreover, a terminal (e.g., 200_1) may send a request for direct data transmission/ reception between the terminals 200_1 and 200_2 via the direct link L1 to the base station 100. In response to the request from the terminal 200_1, the base station 100 may allow the existing link L2 to be changed to the direct link L1 or allow the direct link L1 to be established after the release of the existing link L2. Also, the base station 100 may add the direct link L1 while maintaining the existing link L2, rather than changing the existing link L2 to the direct link L1.

After completing the connection request for direct communication from the terminals 200_1 and 200_2, the base station 100 may notify the terminals 200_1 and 200_2 of the completion to enable data transmission/reception between the terminals 200_1 and 200_2 via the direct link L1.

2. When there is No Link Between Two Terminals 200_1 and 200_6

When there is no link (or connection) between two terminals 200_1 and 200_6, the terminal 200_1 requests the base station 100 to make a service connection with the other terminal 200_6.

Upon receiving the service connection request, if the base station 100 determines, according to a discovery result (the measured received signal strength of a reference signal), that it is difficult to establish a direct link between the two terminals 200_1 and 200_6, or if the base station 100 has not received a discovery result report, the base station 100 responds to the request of the terminal 200_1 for a service connection between the two terminals 200_1 and 200_6 via the base station 100 and sends the service connection request to the other terminal 200_6. The terminal 200_1 makes the service connection upon receiving the response from the base station 100, and the terminal 200_6 responds to the request of the base station 100 for the service connection upon receiving the service connection request from the base station 100. When the service connection is successfully established, the two terminals 200_1 and 200_6 transmit/receive data via the base station 100.

Upon receiving the service connection request, if the base station 100 determines, according to a discovery result (the measured received signal strength of a reference signal), that it is possible to establish a direct link between the two terminals 200_1 and 200_6, the base station 100 responds to the request of the terminal 200_1 that it is possible to establish a direct link and requests the other terminal 200_6 to transmit/receive data to/from the terminal 200_1 via the direct link. Upon receiving the response from the base station 100, the terminal 200_1 waits until the other terminal 200_6 completes the establishment of the direct link. When the direct link establishment between the two terminals 200_1 and 200_6 is successfully completed, the two terminals 200_1 and 200_6 transmit/receive data via the direct link. As described above, the base station 100 may request the terminal 200_1 to wait for a given period of time to establish a direct link with the terminal 200_6, and once the direct link establishment is completed, the base station 10 may notify the terminal 200_1 of this fact so that the two terminals 200_1 and 200_6 can transmit/receive data via the direct link.

Next, referring to FIG. 3B, a detailed description will be given of a case where a service connection (or link L2) between two terminals 200_1 and 200_2 via the base station 100 is required because it is difficult to transmit/receive data via the direct link L1. It is assumed that it is difficult to transmit/receive data anymore via the direct link L1 established between the two terminals 200_1 and 200_2 as the terminal 200_2 moves from a point P1 to another point P2. The link L2 between the two terminals 200_1 and 200_2 corresponds to communication (or service) between the two terminals 200_1 and 200_2 via the base station 100.

The base station 100 may allow the link L2 to be set newly or allow the direct link L1 to be changed to the link L2.

To support both data transmission/reception via the direct link L1 and data transmission/reception via the base station 100 (i.e., data transmission/reception via the link L2), the terminals 200_1 and 200_2 may use a service (or link) identifier or indicator (hereinafter, "service identifier") indicating whether service is provided via the base station 100 or via the direct link L1. A data transmitting terminal (e.g., 200_1) uses a service identifier or the like to inform the base station 100 and a data receiving terminal (e.g., 200_2) whether data is transmitted via the direct link L1 or via the base station 100. If the terminal (e.g., 200_2) cannot receive data via the direct link L1, the base station 100 may receive the data from the terminal (e.g., 200_1) and relay the data to the terminal (e.g., 200_2). If the terminal (e.g., 200_1) transmits data using an allocated direct link resource, a service can be identified through the resource used for data transmission, even without a service identifier or the like. In this case, data to be transmitted via the base station 100 may include this fact (service identifier or the like).

A data transmitting terminal (e.g., 200_1) may inform the base station 100 whether data is transmitted via the base station 100 or via the direct link L1 when sending a request for data transmission to the base station 100. In this case, no service identifier or the like may be used, as in the case when the terminal (e.g., 200_1) transmits data using an allocated direct link resource. Also, when the direct link L1 is established, the terminals 200_1 and 200_2 may manage the identifiers indicating service through the medium of the base station 100 and service via the direct link L1, respectively, and use them for data transmission.

If the identifier indicating service through the medium of the base station 100 and the identifier indicating service via the direct link L1 are not stored/managed (e.g., if it is determined which service (service via the base station 100 or service via the direct link L1 ) will be provided according to time), the terminals 200_1 and 200_2 may provide services via the base station 100 or service via the direct link L1 by a link change (L1->L2 or L2->L1). A link change for service provision is usually requested by the base station 100. Specifically, the base station 100 may request the terminals 200_1 and 200_2 to change links (e.g., L1->L2), or request them to establish a link L2 after the release of the direct link L1. When the link change (or service change) is completed or the establishment of the link L2 is completed after the release of the direct link L1, the base station 100 may allow the terminals 200_1 and 200_2 to continuously provide service by allocating resources. Also, the base station 100 may maintain both the direct link L1 between the terminals 200_1 and 200_2 and the link L2 via the base station 100.

Figure 4:
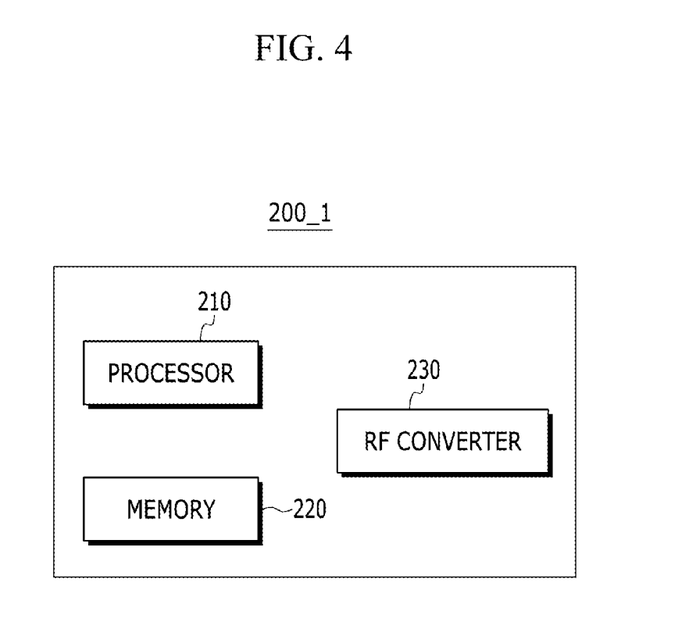
FIG. 4 is a view showing a terminal according to an exemplary embodiment of the present invention.

FIG. 4 is a view showing the terminal 200_1 according to an exemplary embodiment of the present invention.

The terminal 200_1 includes a processor 210, a memory 220, and a radio frequency (RF) converter 230.

The processor 210 may be configured to implement the procedures and methods explained in FIGS. 1 to 3B.

The memory 220 is connected to the processor 210, and stores various kinds of information related to operations of the processor 210.

The RF converter 230 is connected to the processor 210, and transmits or receives a wireless signal.

The terminal 200_1 may have a single antenna or multiple antennas.

According to an exemplary embodiment of the present invention, when it is intended to carry out data exchange between terminals via a wireless direct link, a device discovery for direct link establishment can be performed efficiently.

Moreover, according to an exemplary embodiment of the present invention, a device discovery can be performed while continuously providing service between a base station and a terminal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a first terminal communicating with a base station to perform direct communication with a second terminal, the method comprising:
   receiving, from the base station, a message requesting the first terminal initiate terminal discovery;
   determining a first timing for transmitting or receiving a first signal to or from the base station;
   determining a second timing for transmitting a second signal for terminal discovery to the second terminal;
   changing either the first timing or the second timing in response to the first timing and the second timing overlapping;
   transmitting, to the second terminal, the second signal for terminal discovery in response to the changing of either the first timing or the second timing; and
   establishing a first link for direct communication with the second terminal in response to the transmitting of the second signal for terminal discovery, and a determination that direct communication with the second terminal is possible,
   wherein the message requesting the first terminal initiate terminal discovery comprises information indicating whether a received signal strength of the second signal for terminal discovery will be reported to either the base station or the first terminal.

2. The method of claim 1, wherein the first signal is either a feedback signal transmitted to the base station or a data signal periodically transmitted to the base station.

3. The method of claim 2, wherein the changing of either the first timing or the second timing comprises:
   receiving first timing change information from the base station; and
   changing the first timing based on the first timing change information.

4. The method of claim 2, wherein the changing of either the first timing or the second timing comprises changing the first timing to preset timing.

5. The method of claim 4, wherein the preset timing is a K-th uplink timing before or after the second timing, and K is a natural number.

6. The method of claim 4, further comprising:
   periodically transmitting the first signal to the base station after transmitting the first signal at the preset timing.

7. The method of claim 1, wherein the first signal is a signal associated with an operation based on a time synchronization as a part of hybrid automatic repeat request (HARQ) operations.

8. The method of claim 1, wherein the first signal is a signal associated with a persistent resource allocation operation.

9. The method of claim 1, wherein the first signal is a signal associated with a group resource allocation operation.

10. The method of claim 1, further comprising:
    receiving, from the base station, first information indicating whether direct communication is possible, the determination being based on the received signal strength of the second signal.

11. The method of claim 10, further comprising:
    establishing the first link for direct communication with the second terminal in response to the first information indicating that direct communication with the second terminal is possible.

12. The method of claim 11, wherein the establishing of the first link for direct communication with the second terminal comprises,
    when in a first communication with the second terminal via the base station, transmitting, to the base station, a request message for changing a second link corresponding to the first communication with the second terminal via the base station to the first link for direct communication with the second terminal.

13. The method of claim 12, wherein the request message comprises a service connection identifier indicating the second link.

14. The method of claim 11, wherein the establishing of the first link for direct communication with the second terminal comprises,
    when a second link corresponding to a first communication with the second terminal via the base station is not established, transmitting a request message for establishing the first link for direct communication with the second terminal to the base station.

15. A method for a first terminal communicating with a base station to perform direct communication with a second terminal, the method comprising:
    determining a first timing for transmitting or receiving a first signal to or from the base station;
    determining a second timing for receiving a second signal for terminal discovery from the second terminal; and
    changing the first timing in response to the first timing and the second timing overlapping,
    wherein the changing of the first timing comprises changing the first timing based on at least one of first timing change information from the base station and a preset timing,
    the preset timing is a K-th uplink timing before or after the second timing,
    K is a natural number, and
    the first signal is a signal based on time synchronization between the base station and the first terminal.

16. The method of claim 15, wherein the first signal is either a feedback signal transmitted to the base station or a data signal periodically transmitted to the base station.

17. The method of claim 15, further comprising:
    reporting the received signal strength of the second signal to the base station, wherein the reporting of the received signal strength comprises using a method selected from the group consisting of:
    a first reporting method of reporting the received signal strength of the second signal each time the second signal is received,
    a second reporting method of reporting the received signal strength of the second signal when the received signal strength of the second signal is greater than a threshold, and
    a third reporting method of reporting an average received signal strength of a plurality of the second signals received during a first period.

18. A terminal comprising:
a radio frequency converter;
a processor connected to the radio frequency converter, the processor being configured to
control direct communication with a first terminal and communication with a base station
receive, from the base station, a message requesting the first terminal initiate terminal discovery,
determine a first timing for transmitting or receiving a first signal for communication with the base station to or from the base station,
determine a second timing for transmitting a second signal for terminal discovery to the second terminal,
change either the first timing or the second timing in response to the first timing and second timing overlapping,
generate the second signal for terminal discovery with the second terminal in response to the changing of either the first timing or the second timing, and
establish a first link for direct communication with the second terminal in response to the generation of the second signal for terminal discovery, and a determination that direct communication with the second terminal is possible,
wherein the message requesting the first terminal initiate terminal discovery comprises information indicating whether a received signal strength of the second signal for terminal discovery will be reported to either the base station or the first terminal.

* * * * *